March 3, 1964 D. L. SNYDER ETAL 3,123,700

RADIATION EXPOSURE UNIT

Filed March 28, 1960 2 Sheets-Sheet 1

INVENTORS
DONALD L. SNYDER
RICHARD G. TESKE

Carpenter, Abbott, Coulter & Kinney
ATTORNEYS

March 3, 1964 D. L. SNYDER ETAL 3,123,700

RADIATION EXPOSURE UNIT

Filed March 28, 1960 2 Sheets-Sheet 2

INVENTORS
DONALD L. SNYDER
RICHARD G. TESKE

Carpenter, Abbott, Coulter & Kinney
ATTORNEYS

United States Patent Office 3,123,700

Patented Mar. 3, 1964

3,123,700

RADIATION EXPOSURE UNIT

Donald L. Snyder, St. Paul, and Richard G. Teske, St. Paul Park, Minn., assignors to Minnesota Mining and Manufacturing Company, St. Paul, Minn., a corporation of Delaware Filed Mar. 28, 1960, Ser. No. 17,873

7 Claims. (Cl. 219—19)

This invention relates to apparatus for exposing sheet materials to intense radiation.

The apparatus of this invention is useful in processes where sheet materials are treated with any desired type of intense radiant energy. One example of such a process is in the fusion of a rough thermoplastic coating into a smooth, uniform and continuous layer. The apparatus is particularly useful in processes for treating previously printed or inked heat-expandable sheet materials with intense radiant energy to gain high, graduated relief patterns in the sheet materials. These latter sheet materials generally have a backing member and a layer of a heat-softenable resinous material with a heat-sensitive blowing agent distributed therethrough. The inked pattern absorbs radiant energy, resulting in localized increases in temperature, which in turn causes the blowing agent to generate gas and the resinous material to soften and expand, providing a permanent increase in thickness at the areas affected, to a degree commensurate with the energy absorbed.

As in the case of the radiation exposure unit described in O'Mara Patent No. 2,903,546, the apparatus of this invention holds sheet materials in position for exposure to intense radiation without applying any special pressure such as caused by a mechanical constricting device over areas of the sheet material undergoing exposure, thus permitting such areas to rearrange themselves or change in thickness under the effects of radiation as is desired. However, a significant improvement provided by the apparatus of the instant invention over that apparatus specifically described in the aforenoted O'Mara patent is that entire sheets, including even terminal edge portions, may be exposed to radiation and undergo rearrangement without interference from any pressure caused by a mechanical constricting device.

The apparatus of our invention holds sheet materials in position for exposure to radiation without any visible clamps or gripping devices apparent to an operator. Thus, a sheet material may be expanded or treated with radiant energy even in all edge portions by using our apparatus. Use of our apparatus permits accomplishment of the task quickly and conveniently. There is no need to wait for various elements of our apparatus to come into synchronization before feeding a sheet material for exposure to radiation. Thus, operation of the instant apparatus becomes extraordinarily simple and requires negligible training of operators.

Sheet materials of indefinite length may continuously be exposed to radiation using the apparatus of the instant invention, and the entire sheet material selectively expanded in relief or rearranged in pattern under the effect of such exposure.

Additional advantages and improved features of our apparatus will be evident as this description proceeds.

The invention will be described with the aid of an illustrative drawing in which.

Figures 1, 4:
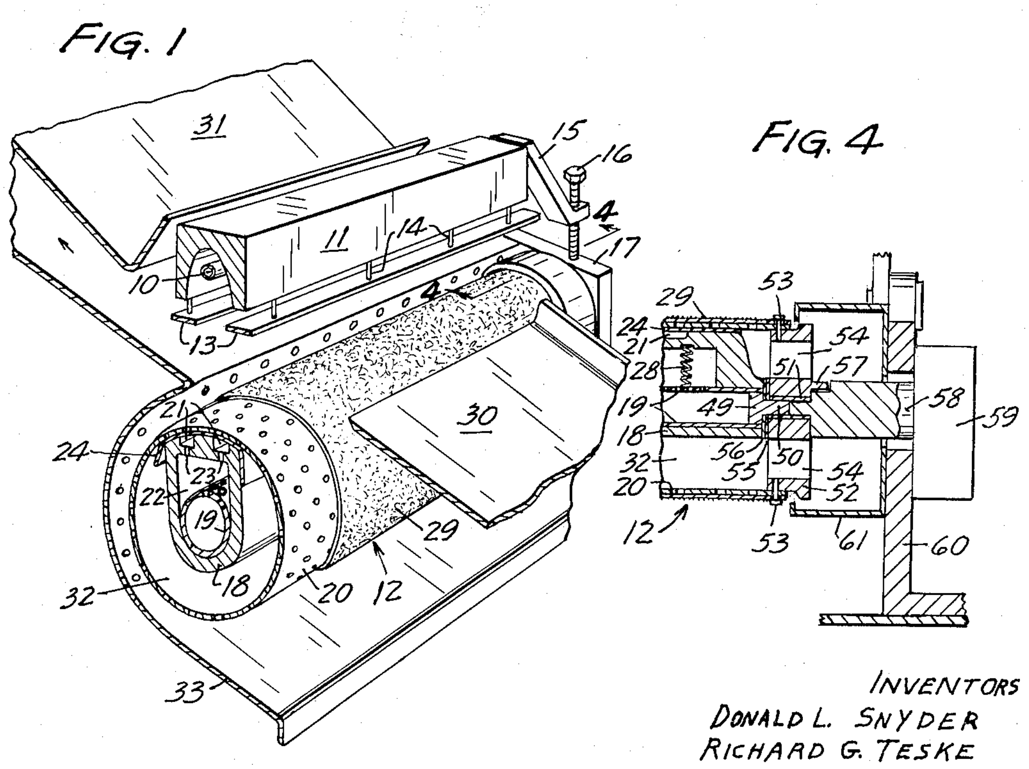
FIGURE 1 is a sectional perspective view of our apparatus with parts broken away so as to facilitate clarity of illustration.
FIGURE 4 is a schematic cross-section taken approximately on line 4—4 of FIGURE 1.

Referring particularly to FIGURE 1, the general relationship of the elements of the apparatus and their relative operation will be explained. A tubular or elongated radiation source 10 is mounted within an elongated parabolic or elliptical reflector 11 so that radiation from the source is directed out of the reflector in a band upon rotatable cylinder 12. Immediately beneath reflector 11, suspended in spaced relation from each edge of its elliptical reflecting surface, are fins 13. These fins are spaced from the terminal edges of the elliptical reflector, and are attached to such edges by pins 14. The reflector itself is mounted to arm 15, which in turn is pivotable with respect to cylinder portion 12 and associated parts of the apparatus. Screw 16, through a flange off arm 15, may be used to adjust the distance of tubular source 10 and reflector 11 with respect to rotatable cylinder 12. The end of screw 16 abuts against a solid rigidly mounted frame element 17.

Within rotatable cylinder 12 is mounted a housing 18 (see FIGURES 1 and 3) which remains stationary during rotation of cylinder 12. Housing 18 is in the nature of a manifold extending about a perforated internal tube 19. Both housing 18 and tube 19 remain stationary during rotation of cylinder 12; and perforated tube 19 is connected to a vacuum pump for withdrawal of air therefrom and from the internal portion of manifold 18, as well as from the portion of porous cylinder 12 located thereabove.

The upper portion or head of manifold 18 is arced for cooperation with the internal portion of perforated cylindrical shell 20, which latter is rotatable. In the upper curved head portion of manifold 18 are two grooved depressions or recesses 21, extending substantially the full length of the manifold within rotatable cylinder 12, but terminating short of its ends (see FIGURES 1, 3 and 4). These recesses are connected to the interior portion 22 of manifold 18 by a plurality of apertures 23 or conduits distributed throughout the length of the manifold. Between the arced upper surface of manifold 18 and the interior of perforated cylindrical shell 20 is a porous gasket 24, suitably of cloth or felt-like material. This gasket extends the length of manifold 18 and may serve an insulating function. It is permanently affixed to the leading edge of the manifold by a band and/or screws as at 25 (see FIGURE 3). The trailing edge of the gasket is preferably left loose. This allows for any stretching of the material during rotation of cylinder 12 in the direction of the arrow in FIGURES 1 and 3, and avoids binding of the gasket material.

Figure 3:
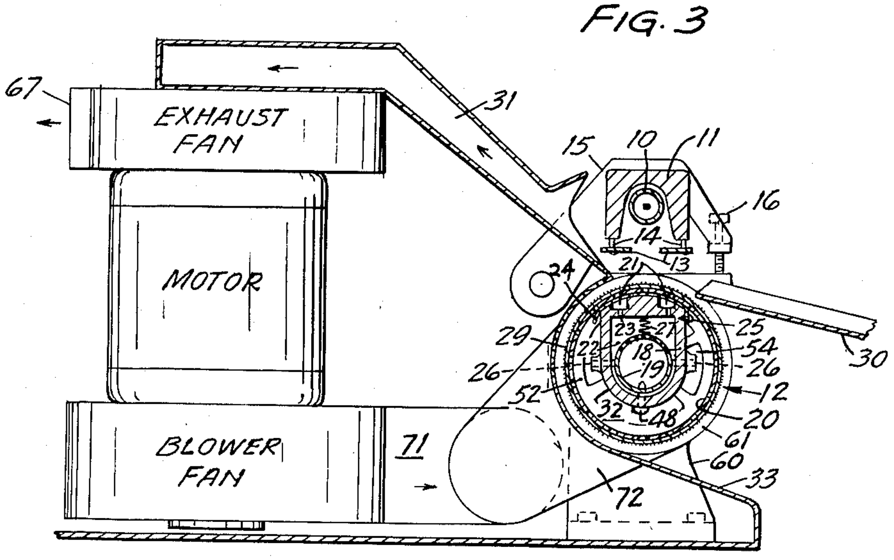
FIGURE 3 is a schematic cross-section taken on line 3—3 of FIGURE 2.

As particularly illustrated in FIGURE 3, manifold 18 and perforated vacuum tube 19 are held in floating alignment by adjustable abutting pins 26 mounted at intervals in the sides of manifold 18 and abutting against tube 19. Lock pin 48 mounted in manifold 18 extends through an aperture in tube 19 to lock tube 19 and manifold 18 against relative rotational movement. A plurality of springs such as 27 in FIGURE 3, and 28 in FIGURE 4, tend to press manifold 18 and its gasket 24 in floating abutting relationship against the interior of cylindrical cylinder porous shell 20.

On the surface of perforated cylindrical shell 20 is a porous fabric covering 29 which fits snugly upon the shell and rotates with it.

A feed chute or guide surface 30, slightly spaced from fabric covering 29 so as to permit free rotation of cylinder 12, extends toward the front of the machine in a plane approximately tangential to the outer surface of cylinder 12. While not illustrated in FIGURE 1, the feed chute or guide 30 is suitably rigidly mounted at its sides to a portion of the frame of the apparatus (see FIGURE 2).

During operation, a sheet material is slid along feed chute 30 and on to the surface of rotating cylinder 12, where it is gripped by suction effect created beneath porous cylinder 12 as it rotates over the upper arced head portion of manifold 18. Air is sucked through fabric covering 29 and porous shell 20 as they pass over the head portion of manifold 18; then this air passes through the apertures 23 in the head of manifold 18 into space 22 and out through tube 19. Cylinder 12 rotates carrying with it the sheet material. During the time that the sheet material is gripped upon the surface of cylinder 12 by suction (i.e., by a differential in air pressure above from that beneath the sheet material, and the higher normal air pressure above the sheet serving to force it into contact with the cylinder), exposure of the surface of sheet materail to intense radiation from source 10 is accomplished. Simultaneously air is drawn across the surface of the sheet material and above and below fins 13 depending from the reflector housing 11. This air is drawn through duct 31 and serves to reduce the temperature to which fins 13 would otherwise rise during operation, thereby aiding in stabilizing external or non-radiation temperature effects during processing a sheet so that the effects of radiation on long lengths of sheet material remain substantially the same throughout its length without untoward influence from side temperature effects.

Although not shown in detail in FIGURE 1, chamber 32, defined by the internal surface of perforated shell 20 and the external portion of manifold 18, continuously receives a draft of air under slight pressure during operation. This air escapes through the perforations of shell 20 and facilitates limiting the rise in temperature of the rotatable cylinder during continuous operation.

Guide shield 33 (see FIGURES 1 and 3) extends in spaced relationship about the back and bottom portion of rotating cylinder 12, and is perforated to permit air passage. During intervals when a sheet material is not passing through the apparatus for exposure, and the apparatus is maintained in operation, cooling air escaping from chamber 32 through porous shell 20 tends also to pass through the perforations of guide 33. It will also be understood that sheet materials fed into our apparatus will be returned to an operator while sliding loosely against guide 33 after the effect of vacuum gripping of the sheet onto cylinder 12 is terminated. Cooling air escaping from rotating cylinder 12 in areas of the cylinder other than that zone of the cylinder over the head of the manifold serves to blow sheet materials from the surface of cylinder 12 after the exposure zone is passed during rotation.

Figure 2:
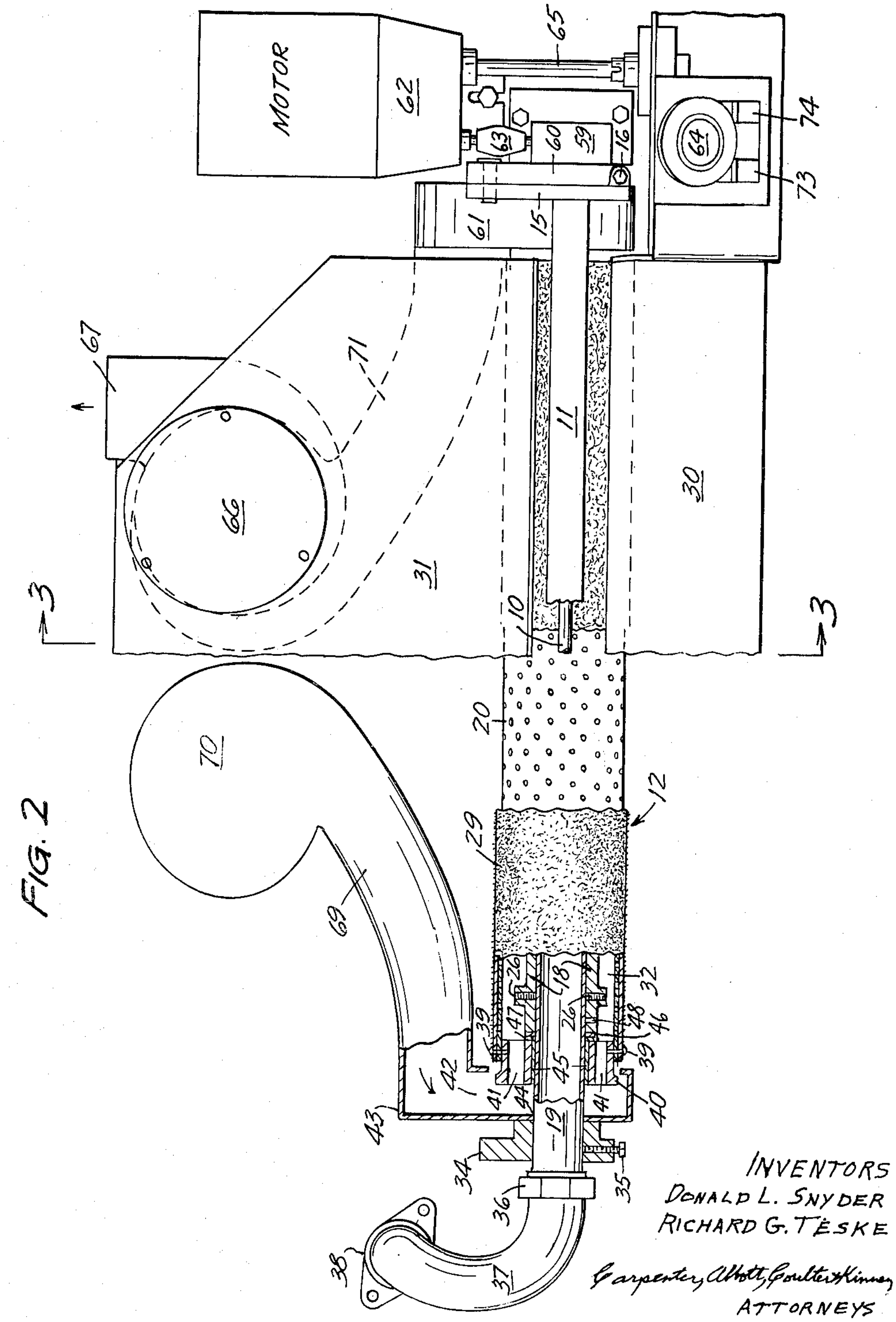
FIGURE 2 is a schematic top elevation, with the left half broken away and partially in section to illustrate internal details, and with the supporting frame or base broken away to facilitate clarity of illustration.

Now referring to FIGURE 2, the elements supporting the left end of cylinder 12 will be described. In FIGURE 2 these elements are shown in horizontal section in a plane passing through the line of rotation of cylinder 12. Vacuum tube 19 extends beyond the terminal portion of cylinder 12 and is locked rigidly against rotation to a stationary part 34 of the frame for the apparatus by a lock pin or screw 35. The vacuum tube 19 serves as the shaft upon which wheel 40 supporting the left end of cylinder 12 rotates. Porous rotatable shell 20 with its associated fabric covering 29 is firmly clamped, as by screws 39, to the rim of rotatable wheel 40. Both the rim and hub portion of wheel 40 are rather wide, and separated or held in position by thick spokes or bracing elements between which apertures 41 extend for the passage of air through support wheel 40 into the interior of porous shell 20. A cylindrical bearing or bushing 45, suitably of brass, is located between vacuum tube 19 and the interior of the hub of wheel 40 so as to facilitate free rotation of the wheel about stationary tube 19 during operation of the apparatus.

The spaces 41 in wheel 40 provide a connecting passage through wheel 40 from chamber 42 defined by housing 43 into the interior space 32 (see FIGURES 1 and 2) within shell 20. Housing 43 is suitably rigidly affixed to an element of the frame (not shown in detail) of the apparatus by any suitable means. Also, the wall of housing 43 farthest from wheel 40, or outermost from the revolving cylinder 12, suitably abuts in reasonably tight relationship against vacuum tube 19, as at 44. The wall of housing 43 which is adjacent to wheel 40, however, is spaced suitably to permit free rotation of the wheel in operation.

As illustrated in the horizontal section at the left of FIGURE 2, the connection between tube 19 and manifold 18 adjacent wheel 40 is sealed by a flexible gasket 46, suitably of rubber or felt, in combination with a seal ring 47, which latter is preferably of brass since it serves as a bearing surface against which the hub of wheel 40 abuts during rotation. At the end of vacuum tube 19 is a band 36 which serves to clamp vacuum hose 37 firmly about vacuum tube 19. Hose 37 terminates at an inlet port assembly 38 to the intake chamber of a vacuum pump of conventional design (not shown).

Next, referring to FIGURE 4, the mounting of the right end of cylinder 12 and associated elements will be explained. The terminal end of vacuum tube 19 is provided with a plug 49 with a terminal cylindrical projection 50 which is journaled within a cylindrical bushing 51 located within the hub of wheel 52. Wheel 52 with associated bushing 51 is freely rotatable about the cylindrical projection 50. Perforated cylindrical shell 20 and its associated fabric covering 29 are rigidly affixed to the rim portion of wheel 52 by screws 53 or the like.

Between manifold 18 and hub 52, and extending against the flange portion of the plug 49 adjacent projection 50 is a brass sealing ring 55 and a flexible rubber gasket 56. The sealing ring and gasket serve to seal the space between manifold 18 and tube 19 so as to prevent loss of vacuum conditions within the manifold housing during operation. Wheel 52 rests or bears against sealing ring 55 during rotation.

Projecting laterally from the hub of wheel 52 is a pin 57 which extends into an eccentric recess in shaft 58 and locks support wheel 52 with shaft 58 for rotation. Shaft 58 also extends within the bushing 51 of wheel 52. Power is transmitted to shaft 58 through any suitable gear box 59, the details of which may vary considerably, as is well understood in the art, and accordingly are not shown in the drawing. Shaft 58 is itself journaled in a bearing rigidly mounted to frame 60 of the apparatus through the intermediary of the gear box.

Extending through wheel 52 between its rim and hub portions are apertures 54 (see FIGURES 3 and 4), permitting free passage of air through this wheel in essentially the same manner as through wheel 40. A housing 61 for the delivery of air to the end of wheel 52 is suitably mounted on the frame of the apparatus so that there is a clearance between the defining walls of the housing and the rotatable parts of the adjacent assembly, i.e., shaft 58 and wheel 52. Air forced through this housing 61 enters space 32 between manifold 18 and shell 20 by passing through ports 54 in wheel 52.

The motive power (see FIGURE 2) for rotating cylinder 12 is transmitted from the motor, labeled as such in FIGURE 2, through a variable speed drive box 62 and coupling 63 to the gear box 59 in which shaft 58 is journaled. A dial 64 on the frame of the apparatus operates through shaft 65 to variable speed drive box 62 and affords a convenient way to vary the rate of rotation of the coupling shaft 63 transmitting power for the rotation of cylinder 12. It will be evident that other means for adjusting the rate of rotation for cylinder 12 may be employed, or the apparatus may be built without such means for adjusting rate of rotation.

Underneath the duct work labeled 66 in FIGURE 2 is an additional motor having a vertical shaft with an exhaust fan mounted above the motor and a blower fan mounted below it. A similar assembly, amounting to essentially a mirror image of that on the right half of FIGURE 2, is located in the left half of the apparatus; and the representation thereof is labeled 70 in FIGURE 2. The exhaust fans serve to draw air about reflector 11 and particularly about fins 13 located therebeneath (see FIGURES 1 and 3), and thereby limit the temperature rise of fins 13, as well as to some extent the temperature rise of reflector 11 itself and the surface of cylinder 12. The air withdrawn travels through duct 31, which extends the length of cylinder 12, and then passes through one or the other exhaust fan and exits through ports at the rear of the apparatus. In the right half of the apparatus, such air exits through the port labeled 67, as illustrated in FIGURE 2. The exhaust action about reflector 11 and over a sheet material exposed to radiation, in addition to performing a cooling function, also advantageously serves to remove any objectionable gases generated during the exposure step.

The broken left side of FIGURE 2 illustrates the duct work and associated blower fan for providing air to the left end of cylinder 12. A duplicate of this assembly, of course, provides air to the right end of cylinder 12. The coaction causes a slight pressure to be built up within cylinder 12 and forces air through the porous cylinder for cooling action. For explanation purposes it is sufficient here to point out that air is taken in by blower fan in assembly 70 of FIGURE 2 and blown through duct 69 into chamber 42 where it passes between the spokes of wheel 40 into cylinder 12.

In FIGURE 3, what has just been discussed is more graphically illustrated for the right half of the apparatus. Air is drawn by the exhaust fan through duct 31 and exhausted through duct 67. Intake air from a port underneath the blower fan is blown by the fan through duct 71 into chamber 72 of the housing 61.

The motor furnishing power for rotation of cylinder 12, as well as each motor to operate the dual exhaust and blower fan assemblies 66 and 70, a suitable motor for the vacuum pump, and the power source for the radiant energy tubular element 10—all are energized by the flick of a single switch on the apparatus. An "on" switch is designated graphically by numeral 73 in FIGURE 2 and an "off" switch by numeral 74. The necessary wiring from a switch or switches to the four motors and the tubular element 10 will be evident to anyone skilled in the art, and for simplicity's sake, the drawings do not include lines illustrating details of electrical connections. They are elementary in nature. Of course, if desired, each motor for the apparatus, as well as the tubular element 10, might be energized by separate switches; and operation just as successful as that obtained by energizing all motors and element 10 by a single switch is possible. Further, if desired, a single motive power source may be connected by shafts and gears or belts and pulleys to various cooling fan assemblies, the vacuum pump and cylinder shaft. There is no need to synchronize the time that the source for radiant energy is energized with the time that rotation of cylinder 12 is initiated, although energizing of the source will ordinarily not be accomplished except after, or at the same time, rotation of cylinder 12 is initiated so as to avoid burning or scorching of the fabric covering of cylinder 12 by over-exposure. Because of the cooling complex of our apparatus, all elements may remain in continuous operation, even though no sheet material is being processed.

A suitable elongated source 10 to provide intense infrared radiation is a tungsten filament, quartz envelope, gas filled lamp having a lighted length of about 30 inches and a wattage of about 3000 giving theoretically a watt density of about 100 watts per inch of filament length when operated at 480 volts. The filament under such conditions has an apparent color temperature in excess of about 2400° K. when measured by an optical pyrometer. The elongated source employed should preferably have a length approximately the same as cylinder 12. Reflector 11 and fins 13, when employed either to mask radiation or as cooling surfaces or both, should also be of approximately the same length as source 10.

The padded surface of cylinder 12 is preferably sufficiently heat-resistant so that continuous operation of our apparatus, even in the absence of passing a sheet material therethrough, does not cause substantial scorching of the pad. A preferred type of heat-resistant porous pad or blanket or covering on cylinder 12 is a porous woven glass cloth, or a flocked material, etc., although any suitable porous and heat-resistant fabric having a sufficient coefficient of friction in relation to processed sheet materials to cause the sheet materials to move with the rotation of the padded covering under the influence of the vacuum gripping means may be employed. In this respect, the covering should provide a non-slip surface for the sheet material under the conditions of processing. This condition is easily obtained using ordinary fabric or cloth coverings, flocked coverings, and even wire materials, if such are desired. The combination of a "friction" surface under the conditions of processing plus the differential in air pressure above from that below the sheet on the support cylinder serves to hold the sheet in position on the support cylinder during processing. As will be evident, the sheet materials to be processed in this apparatus are relatively non-porous as compared to the porosity of the support cylinder assembly 12; however, this does not mean that sheet materials to be processed must be non-porous. They may be porous but in a relative sense are much less porous than the support cylinder assembly. Preferably the fabric covering for the cylinder is a seamless sleeve which fits snugly on shell 20 when slipped over an end of the shell. By avoiding seams in the covering, problems with respect to the pattern of a seam appearing in a radiation-treated sheet material such as one comprising a heat-expansible resinous coating are avoided.

As aforestated, the suction or vacuum created underneath a sheet material on the surface of cylinder 12 as it rotates over the head of manifold 18 in operation is sufficient to cause a drop in the air pressure immediately beneath the sheet material as compared to normal air pressure in the environment about the sheet material. In practice, the rate of air flow through cylinder 12 as it passes over the head of manifold 18 is preferably reduced, suitably by regulating the size of the apertures in manifold 18 and shell 20, so that a slight negative pressure or vacuum is caused to be created in manifold 18 by the operation of the vacuum pump employed, even in the absence of placing a sheet material over cylinder 12. When the air flow is properly adjusted, the blocking of some ports of air passage through cylinder 12 by the act of placing a sheet material thereover will be sufficient to cause a drop in the air pressure in the area of the support member immediately underneath the sheet material as rotation over the head of manifold 18 occurs. This condition is created by the action of the suction pump continuously withdrawing air from the head portion of the manifold 18, which in turn draws air from the support cylinder assembly for the sheet material as it passes over the head of manifold 18. Of course, a variety of apparatus design features may be used to gain this result.

As a specific non-limitative illustration of a suitable porous cylinder assembly in combination with suitable vacuum means, we have employed with success a 26 inch long cylindrical steel shell 20 of about 4 inches internal diameter having a staggered pattern of $\frac{1}{32}$ inch diameter apertures occupying about 20–25% of the surface area of the shell, with a porous woven glass cloth seamless sleeve of about 1.13 lbs. per square yard snugly fitted over the cylindrical shell. With such cylinder assembly, we have used a $\frac{7}{8}$ horse-power vacuum pump capable of drawing about 114 cubic feet of air per minute. The apertures for vacuum tube 19 were distributed over the area of the vacuum tube surface exposed to the chamber 22 within manifold 18. The vacuum tube itself had an internal diameter of about 1.5 inches, with apertures on its upper surface totaling about 1.75 square inches. In the head of manifold 18, the longitudinal grooves 21 were about ⅜ inch wide and had apertures of about ⅜ inch diameter distributed uniformly (about 4 inches apart) along the length of the grooves. The combination of the vacuum means and porous elements here specifically set forth for illustrative purposes has served to maintain a slightly reduced air pressure (about 2 feet of water below atmospheric) in the mainfold 18 of the apparatus, and the placing of a sheet material over the cylinder support surface during processing has limited the volume of air passing through the cylinder as it rides over head of manifold 18 and thereby caused, in combination with the continued evacuation of air, a drop in the air pressure immediately beneath the sheet. The drop in pressure has been sufficient to hold the sheet in frictional contact with the support cylinder assembly 12 during rotation.

In describing our invention we have chosen to illustrate the preferred embodiment which employs a cylindrical configuration for the rotatable means carrying the sheet material in spaced relationship past a source of radiation. It will be appreciated that a flexible porous continuous belt could rotate over the manifold 18 and about a spaced roll or pulley apart from manifold 18, with a flat portion of the travel of the belt serving also as a chute or guide surface for feeding sheet materials into the apparatus. Various further modifications of design while retaining essential features will be evident to those skilled in the art upon reading this disclosure.

During operation of our machine, the source for intense radiant energy 10 continuously tends to elevate the temperature of reflector housing 11 and fins 13, as well as the surface of drum 12 on which the radiant energy is directed in a band substantially parallel with the axis of rotation of drum 12. Air movements caused by the assemblies of exhaust and blower fans, as well as to some extent that caused by the vacuum means, tend to reduce the temperature of the apparatus, particularly in respect to the zone through which sheet materials pass when subjected to radiation, so that after a period of about one minute of operation, the temperature conditions in the area or zone of radiation treatment, although somewhat elevated, are relatively stabilized (i.e., equilibrium conditions are reached) permitting continuous reliable processing of sheet materials through the apparatus.

Many modifications of details of our apparatus will readily be visualized. For example, the shape of the manifold 18 may be varied; or manifold 18 and vacuum tube 19 may be formed as integral unit. Indeed, the vacuum tube itself may be omitted where design features for mounting the essential elements are appropriately altered; however, the advantage of using a vacuum tube and manifold configuration as described lies in gaining substantially improved uniform withdrawal of air throughout the length of the manifold assembly. If desired, air for cooling our rotatable cylinder may be forced through only one wheel member, with the spaces between spokes of the other member sealed. Many other variations of design, while maintaining the essential features of the apparatus hereof, will readily occur to those skilled in the art.

The foregoing is to be construed as illustrative of our invention, which is further set forth and defined in the appended claims.

That which is claimed is:

1. In a machine for exposing a sheet material to intense radiation, the combination comprising a source energizable to provide intense radiation, a padded porous support member in fixed spaced relationship from said source, and means to hold a sheet material on said support member while exposing said sheet material to intense radiation, said holding means consisting of vacuum suction of said sheet material into holding contact with said support member.

2. In a machine for exposing a sheet material to intense radiation, the combination comprising a source energizable to provide intense radiation, a padded porous support member adapted to move relative to said source and in spaced relationship from said source, and vacuum suction means associated with said porous support member to hold a sheet material in contact with said support member for exposure to intense radiation during relative movement of said support member and source, said vacuum suction means being the sole means for holding said sheet material in contact with said support member.

3. In a machine for exposing a sheet material to intense radiation, the combination comprising a source energizable to provide intense radiation, a padded rotatable porous continuous support member in spaced relation from said source, and means to grip a sheet material and hold it on the surface of said support member in the portion of the route traversed by the surface of said support member past said source, said last-named means consisting of vacuum suction to create a zone of reduced air pressure immediately beneath said sheet material on said support member.

4. In a machine for exposing a sheet material to intense radiation, the combination comprising a source energizable to provide intense radiation, a rotatable porous continuous support member in spaced relation from said source, means to direct radiation from said source toward the outer surface of said support member over a portion of the route traversed by said surface during rotation, vacuum suction means to grip a sheet material and hold it on the surface of said support member in the portion of the route traversed by said surface through said radiation, and means to cool said support member during rotation, said means to cool comprising means to force air outwardly through said support member in a portion thereof other than the portion thereof subjected to said vacuum suction means.

5. In a machine for exposing a sheet material to intense radiation, the combination comprising a source energizable to provide intense radiation, a rotatable porous continuous support member in spaced relation from said source, means to direct a band of radiation from said source toward the outer surface of said support member, means to grip a sheet material and hold it on the surface of said support member in the portion of said support member rotating through said band of radiation, said last-named means including vacuum suction to create a zone of reduced air pressure immediately beneath said sheet material on said support member, the vacuum suction being concentrated in at least two bands underneath said support member and essentially parallel with the band of radiation directed toward said support member, said vacuum suction bands being disposed on each side of the zone of said support member toward which said band of radiation is directed.

6. In a machine for exposing a sheet material to intense radiation, the combination comprising a source energizable to provide intense radiation, a rotatable porous continuous support member in spaced relation from said source, means to hold a sheet material on the portion of said support member in position to receive radiation from said source, said last-named means including vacuum suction to create a zone of reduced air pressure immediately beneath said sheet material on said support member, and means to force air outwardly through said rotatable porous continuous support member in portions thereof other than the portion thereof subjected to said vacuum suction.

7. In a machine for exposing a sheet material to intense radiation, the combination comprising a single tubular source energizable to provide intense radiation, a porous rotatable cylindrical support member in fixed spaced relationship from said source, means to hold a sheet material on said support member while exposing said sheet material to intense radiation, said holding means including vacuum suction of said sheet material into holding contact with said support member, and a stationary guide surface tangential to said rotatable cylindrical support member for feeding a sheet material onto said support member.

References Cited in the file of this patent

UNITED STATES PATENTS

| | | |
|---|---|---|
| 2,072,875 | Gray | Mar. 9, 1937 |
| 2,074,455 | Carleton | Mar. 23, 1937 |
| 2,091,805 | Chuse | Aug. 31, 1937 |
| 2,224,803 | Standley | Dec. 10, 1940 |
| 2,542,654 | Gadden | Feb. 20, 1951 |
| 2,565,570 | Messinger | Aug. 28, 1951 |
| 2,578,633 | Mauffre | Dec. 11, 1951 |
| 2,728,147 | Imshaug | Dec. 27, 1955 |
| 2,903,546 | O'Mara | Sept. 8, 1959 |
| 2,981,819 | Gregory | Apr. 25, 1961 |
| 3,040,154 | Marsh | June 19, 1962 |